United States Patent
Long

(10) Patent No.: US 12,433,404 B1
(45) Date of Patent: Oct. 7, 2025

(54) ELEVATED STORAGE NET

(71) Applicant: Steve Long, Brentwood, TN (US)

(72) Inventor: Steve Long, Brentwood, TN (US)

( * ) Notice: Subject to any disclaimer, the term of this patent is extended or adjusted under 35 U.S.C. 154(b) by 3 days.

(21) Appl. No.: 18/588,890

(22) Filed: Feb. 27, 2024

Related U.S. Application Data

(63) Continuation-in-part of application No. 29/885,674, filed on Feb. 27, 2023.

(51) Int. Cl.
A47B 96/00 (2006.01)

(52) U.S. Cl.
CPC .................................. A47B 96/00 (2013.01)

(58) Field of Classification Search
CPC ......... B65G 1/02; A47B 47/021; A47B 96/00; A62B 1/22; E04G 21/3266; E04G 21/3261
See application file for complete search history.

(56) References Cited

U.S. PATENT DOCUMENTS

| | | | | |
|---|---|---|---|---|
| 574,898 A | * | 1/1897 | Foster | B60R 21/34 293/45 |
| 2,009,329 A | * | 7/1935 | Scherer | A63B 61/003 245/10 |
| 3,527,319 A | * | 9/1970 | Pedley | A62B 1/22 182/139 |
| 3,949,834 A | * | 4/1976 | Nusbaum | E04G 21/3266 182/138 |
| 4,082,271 A | * | 4/1978 | Martin | A63B 69/0097 473/435 |
| 4,986,389 A | * | 1/1991 | Halligan, Sr. | E04G 21/28 182/138 |
| 5,319,873 A | * | 6/1994 | Krager | A01K 71/00 43/7 |
| 5,582,266 A | * | 12/1996 | Rexroad | E04G 21/3266 182/138 |
| 6,021,702 A | * | 2/2000 | Rexroad | E04G 21/24 87/13 |
| 6,044,595 A | * | 4/2000 | Snow | A62B 1/04 182/138 |
| 6,068,085 A | * | 5/2000 | Denny | E04G 21/3266 182/138 |

(Continued)

FOREIGN PATENT DOCUMENTS

| | | | |
|---|---|---|---|
| JP | 3143816 U | * | 8/2008 |
| KR | 20160033442 A | * | 3/2016 |

*Primary Examiner* — Patrick D Hawn
(74) *Attorney, Agent, or Firm* — Bradley Arant Boult Cummings LLP; Alex H. Huffstutter

(57) ABSTRACT

An elevated net system configured to be coupled between a plurality of support posts may include a net, a closed-loop perimeter support, and a plurality of corner attachment tethers. The net may have a plurality of openings and a plurality of corners defined along a perimeter of the net. The perimeter support may be freely moveable within the openings of the net along the perimeter of the net. Each of the plurality of corner attachment tethers may be configured to be coupled between the perimeter support at one of the plurality of corners of the net and one of the plurality of support posts. The elevated net system may further include at least one bridging strap assembly configured to be coupled between two of the plurality of support posts and including at least one adjustable anchor point for receiving one of the plurality of attachment tethers.

20 Claims, 16 Drawing Sheets

(56) References Cited

U.S. PATENT DOCUMENTS

| | | | | |
|---|---|---|---|---|
| 6,698,604 | B2* | 3/2004 | Denny | A47B 96/00 |
| | | | | 182/138 |
| 6,938,785 | B2* | 9/2005 | Denny | A47F 13/00 |
| | | | | 211/183 |
| 8,430,795 | B2* | 4/2013 | Publicover | A63B 5/11 |
| | | | | 482/35 |
| 8,627,619 | B2* | 1/2014 | Heaney | E04G 21/3266 |
| | | | | 52/222 |
| 9,038,777 | B2* | 5/2015 | Stearns | A62B 1/22 |
| | | | | 182/138 |
| 12,065,792 | B2* | 8/2024 | Schlipper | E01F 3/00 |
| 2002/0104710 | A1* | 8/2002 | Thompson | A62B 1/22 |
| | | | | 182/138 |
| 2002/0148799 | A1* | 10/2002 | Denny | A47B 47/021 |
| | | | | 211/186 |
| 2017/0298641 | A1* | 10/2017 | Rexroad | E04G 21/3266 |
| 2024/0383605 | A1* | 11/2024 | Francki | B64D 9/00 |

* cited by examiner

ELEVATED STORAGE NET

CROSS-REFERENCES TO RELATED APPLICATIONS

This application is a utility patent application claiming the benefit of U.S. Design patent application No. 29/885,674 filed Feb. 27, 2024, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to storage devices. More particularly, the present disclosure pertains to hanging storage nets.

Hanging storage or canopy nets have many uses, such as for storage, lounging, or the like. Current hanging storage nets generally feature an integral reinforced perimeter that is used as an attachment point for coupling to walls, posts, trees, or any other vertical support structure. One issue with current hanging storage nets is that they tend to considerably sag in the middle when loaded with weight. The sag may negatively interfere with other objects positioned below the hanging storage net. In the context of boat slips, is often desirable for the owner of the boatlift to have a convenient storage area for various items such as life jackets, skiing gear, tubes, floats, and various other items. As boat slips typically have very few posts for securement of a hanging storage net, the problem of sag may be exacerbated. The sag of the net may interfere with ingress or egress of boat to the slip or the ability of a boat to be lifted when parked in the slip. Additional issues may include the lack of ease of installation, tamperproof designs, and/or incompatibility with a desired installation location.

BRIEF SUMMARY

In view of at least some of the above-referenced problems in hanging storage nets, an exemplary object of the present disclosure may be to provide an improved elevated net system configured to be coupled between a plurality of support posts. An exemplary such system may desirably feature a high tension, polypropylene knotted net that is suspended horizontally and/or vertically for use as a storage system in the recreational boating industry as well as other industries. The primary use and application may be in the covered marine dock environment to securely store boating accessories and equipment clear of dock walkways and boat slip parking. Through the various combinations and use of nylon straps, cam locks, buckles, ratchet straps and turn buckles the net may be stretched tight at four corners using a docks existing vertical uprights as secure anchor points. The net can then be installed at any height above a parked boat allowing boating equipment to be accessible from the parked boat or from the dock's walkways.

The exemplary such system may further feature a formulated and pre-measured, closed loop braided polypropylene rope that is threaded inside of the net's measured perimeter so that when the rope may be stretched from the docks four vertical uprights. The net may be subsequently stretched to its maximum limit without sacrificing its strength and producing a storage surface with very limited deflection or sag when objects are stored on it. Accessories can then be secured by rope, bungee cords or locked to the net, if desired, with a steel cable.

The exemplary such system may feature customizable sizing such that it may be compatible with any size marina or private dock boat slip. The net can be cut to any size or shape, using any gauge netting material for the application needed. By using a formula based on the net and rope's manufactured composition, the rope may be premeasured and threaded around the circumference of any size net. The four corners of the net may be easily identified using a colored tag and then connected to the dock's structure by a combination of custom-made attachment tether featuring one or more ratchet cam lock straps, ratchet straps, buckle straps, and/or turnbuckles.

The exemplary such system may be designed for easy installation. Once all four corners are connected, the straps may be evenly pulled tight and the one including a turnbuckle may then be tightened to bring the net to its final tight structure. The attachment tether may feature a looped strap end which may be attached to the dock's vertical uprights by wrapping itself around the dock's vertical upright and then pulled back through the looped strap end and drawn tight to secure the net in place.

The flexible feature of the design of the system allows the strap to be wrapped around the most common types, sizes and shapes of vertical supports incorporated in the building of covered marine dock structures. Once the net is stretched to the desired tightness, the excess strap with the six (6) inch pull loop may be threaded through the two, one (1) inch stainless steel rings that are stitched within the three (3) inch strap looped end and then back under the first of the two rings closest to the ratchet buckle and pulled tight. This unique feature locks the strap in place as an added measure of security in case the buckle lever is depressed, preventing the net system from losing tension.

The exemplary such system may feature an adjustable bridging strap assembly that makes the storage net adaptable to virtually any covered boat dock structure. The intended purpose of the adjustable bridging strap assembly may be to provide additional net anchor points when the docks vertical upright spacing is not dimensionally suited for the net.

The adjustable bridging strap assembly may feature a twenty (20) foot long, one (1) inch wide nylon strap consisting of a three (3) inch closed loop on one end and a six (6) inch closed (pull) loop on the opposite end. The end with the six (6) inch pull loop is threaded through a ratchet cam buckle that includes a stitched three (3) inch section of nylon strap and is subsequently stitched to the closed end of a turnbuckle. There a least one additional ratchet cam buckle threaded onto this one (1) inch strap. When two are utilized, they face each other (e.g., having an opposing direction of travel) so that when they are positioned and used as anchor points for the net system, the buckles will remain locked in their relative position on the strap, providing for strong attachment points for the net.

To install the adjustable bridging strap assembly, the three (3) inch loop end may be wrapped around an upright structure or through a suitable attachment point and then the six (6) inch loop end with cam ratchet buckle and turnbuckle is pulled through the three (3) inch loop end. The six (6) inch loop end may then be stretched to the opposite upright or suitable attachment point and attached to it with the turnbuckle. The turnbuckle may be connected to the upright or suitable attachment point using a fourteen (14) inch double loop coupling strap or a thirty-four (34) inch adjustable pole strap. Once the bridging strap is connected on opposite ends and the six (6) inch pull loop of the twenty (20) foot long strap that is threaded through the cam ratchet buckle is pulled, the strap tightens and locks the strap in place. The turnbuckle may then now be tightened giving the bridging strap a rigidity similar to that of a steel cable. Once the bridging strap is taught, the two "anchor point" buckles can be positioned as desired for the optimal positioning of the net.

In a particular embodiment, an exemplary elevated net system as disclosed herein may include a net, a closed-loop perimeter support, and a plurality of corner attachment tethers. The net may have a plurality of openings and a plurality of corners defined along a perimeter of the net. The closed-loop perimeter support may be freely moveable within the openings of the net along the perimeter of the net. Each of the plurality of corner attachment tethers configured to be coupled between the perimeter support at one of the plurality of corners of the net and one of the plurality of support posts.

In an exemplary aspect according to the above-referenced embodiment, each of the plurality of corner attachment tethers may include an adjustable buckle, a corner strap received by the adjustable buckle, and one of a hook or a turnbuckle coupled to the adjustable buckle.

In another exemplary aspect according to the above-referenced embodiment, the corner strap may include a first corner strap end loop and a second corner strap end loop.

In another exemplary aspect according to the above-referenced embodiment, the second corner strap end loop may be larger than the first corner strap end loop.

In another exemplary aspect according to the above-referenced embodiment, the second corner strap end loop may be twice as large as the first corner strap end loop.

In another exemplary aspect according to the above-referenced embodiment, the first corner strap end loop may be configured to be wrapped around one of the plurality of support posts by passing the second corner strap end loop through the first corner strap end loop.

In another exemplary aspect according to the above-referenced embodiment, the one of the hook or the turnbuckle may be coupled to the adjustable buckle using a coupling strap.

In another exemplary aspect according to the above-referenced embodiment, the corner strap may be slidably received by the adjustable buckle in a first corner strap direction and is frictionally engaged by the adjustable buckle in a second corner strap direction.

In another exemplary aspect according to the above-referenced embodiment, the adjustable buckle may include a corner strap release lever configured to allow the adjustable buckle to move along the corner strap in the second corner strap direction when engaged.

In another exemplary aspect according to the above-referenced embodiment, the adjustable buckle may include locking holes and a locking pin configured to be received by the locking holes. The locking pin may be configured to prevent engagement of the corner strap release lever.

In another exemplary aspect according to the above-referenced embodiment, the first corner strap end loop may include two rings positioned thereon. The two rings may be configured to receive the second corner strap end loop in a locked configuration.

In another exemplary aspect according to the above-referenced embodiment, the net may include four corners.

In another exemplary aspect according to the above-referenced embodiment, the elevated net system may further include at least one bridging strap assembly configured to be coupled between two of the plurality of support posts. The at least one bridging strap assembly may include at least one anchor point coupled to a bridging strap of the at least one bridging strap assembly. The at least on anchor point may be configured to receive one of the plurality of corner attachment tethers.

In another exemplary aspect according to the above-referenced embodiment, the at least one anchor point may comprise a first adjustable anchor buckle configured to be freely movable along the bridging strap in a first bridging strap direction and frictionally engage the bridging strap in a second bridging strap direction.

In another exemplary aspect according to the above-referenced embodiment, the first adjustable anchor buckle may include a bridging strap release lever configured to allow the first adjustable anchor buckle to move along the bridging strap in the second bridging strap direction when engaged.

In another exemplary aspect according to the above-referenced embodiment, the at least one anchor point may further comprise a second adjustable anchor buckle. The second adjustable anchor buckle may be configured to freely move along the at least one bridging strap in the second bridging strap direction and frictionally engage the at least one bridging strap in the first direction In another exemplary aspect according to the above-referenced embodiment, each of the at least one bridging strap assembly may include an adjustable buckle, the bridging strap received by the adjustable buckle, the at least one anchor point coupled to the bridging strap, one of a hook or a turnbuckle coupled to the adjustable buckle, and a pole strap.

In another exemplary aspect according to the above-referenced embodiment, the bridging strap may include a first bridging strap end loop and a second bridging strap end loop. The first bridging strap end loop may be configured to be wrapped around one of the plurality of support posts by passing the second bridging strap end loop through the first bridging strap end loop.

In another exemplary aspect according to the above-referenced embodiment, the pole strap may include a first pole strap end loop and a second pole strap end loop. The first pole strap end loop may be configured to be wrapped around a different one of the plurality to support posts by passing the second pole strap second end loop through the first pole strap end loop.

In another exemplary aspect according to the above-referenced embodiment, the one of the hook or the turnbuckle may be configured to be hooked onto the second pole strap end loop of the pole strap. A tension on the at least one bridging strap assembly between the one and the different one of the plurality of support posts may be increased, at least in part, by pulling the second bridging strap end loop of the bridging strap.

In another exemplary aspect according to the above-referenced embodiment, the at least one anchor point may include fastening holes and a fastening pin configured to be received by the fastening holes. The fastening pin may be configured to receive one of the plurality of corner attachment tethers.

In another exemplary aspect according to the above-referenced embodiment, only one of the plurality of corner attachment tethers may include a turnbuckle for adjusting a tension on the closed-loop perimeter support when the elevated net system is installed.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION

Figure 1:
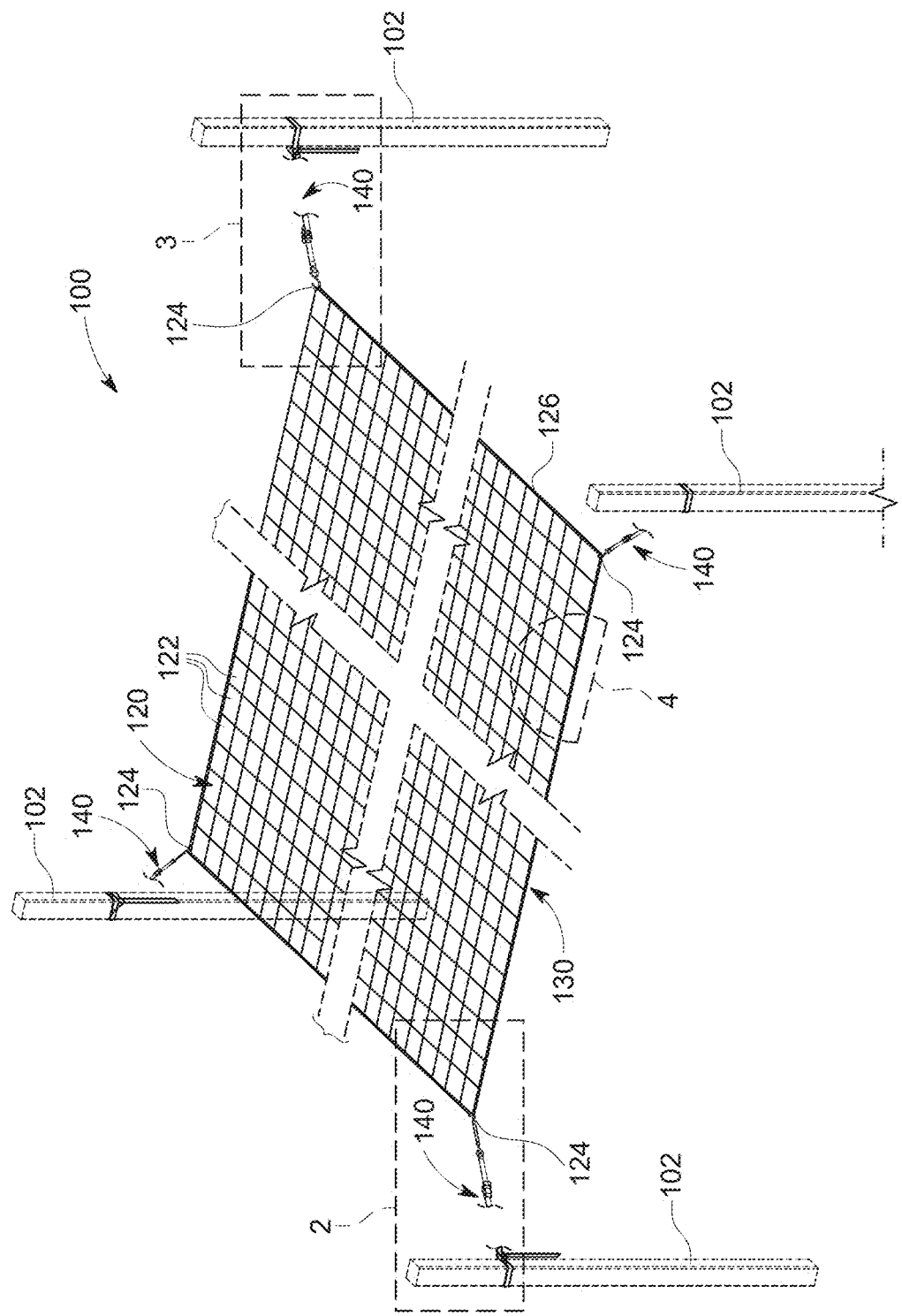
FIG. 1 is a perspective view of an embodiment of an elevated net system in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-4, an embodiment of an elevated net system 100 is provided. The elevated net system 100 may be configured to be coupled between a plurality of support posts 102. The plurality of support posts 102 may be dock posts as illustrated in FIGS. 7-9, 13, and 15, such as, for example, surrounding a boat slip 104 of a boat dock 106. In certain alternate embodiments, the plurality of support posts 102 may be trees such that the elevated net system 100 may be used as a hammock. In other alternate embodiments, the plurality of support posts 102 may be walls of a garage, I-hooks, or the like, such that the elevated net system 100 may be used for various storage applications. In certain embodiments, the elevated net system 100 may be deployed in a horizontal orientation between at least three or more of the plurality of support posts 102. In other optional embodiments, the elevated net system 100 may be deployed in a vertical orientation (not illustrated) between two of the plurality of support posts 102.

The elevated net system 100 may include a net 120 having a plurality of openings 122 and a plurality of corners 124 defined along a perimeter 126 of the net 120. In certain optional embodiments, as illustrated, the net 120 may include four corners. In other optional embodiments (not illustrated), the net 120 may include three, thus defining a triangular net, rather than the illustrated squared style. In further optional embodiments, the net 120 may include more than four corners. The net 120 may be fashioned from any available and environmentally compatible material such as polypropylene or the like.

The elevated net system 100 may further include a closed-loop perimeter support 130 freely moveable within the openings 122 of the net 120 along the perimeter 126 of the net 120. The closed-loop perimeter support 130 may also be referred to herein as a perimeter support 130. For example, the closed-loop perimeter 126 may be woven in an alternating pattern through the openings 122 of the net 120 along the perimeter 126. In other embodiments, the closed-loop perimeter 126 may be woven through the openings 122 of the net 120 along the perimeter 126 in a different pattern. The closed-loop perimeter 126 may be fashioned from any available and environmentally compatible such as braded polypropylene or the like.

Figure 5A:
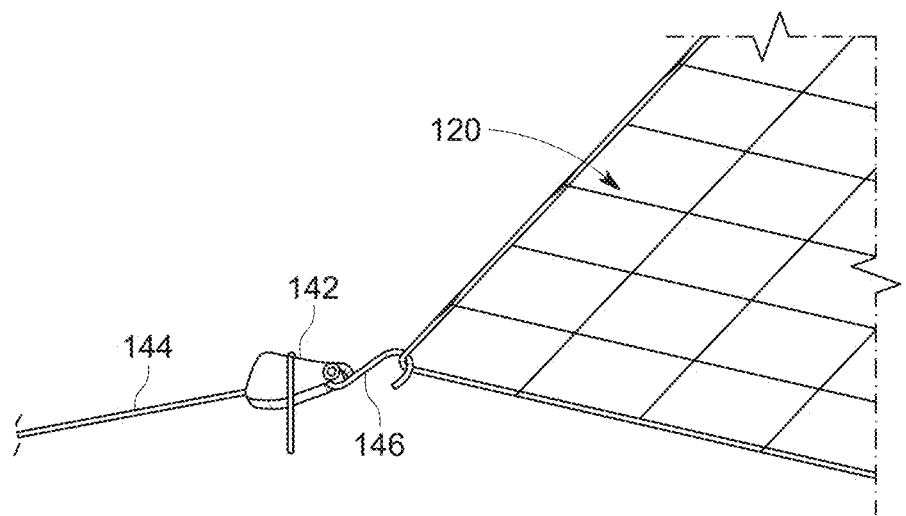
FIG. 5A is an enlarged lower perspective view of an alternate embodiment of dashed area 2 of FIG. 1 of the elevated net system of FIG. 1 in accordance with the present disclosure.
Figure 5B:
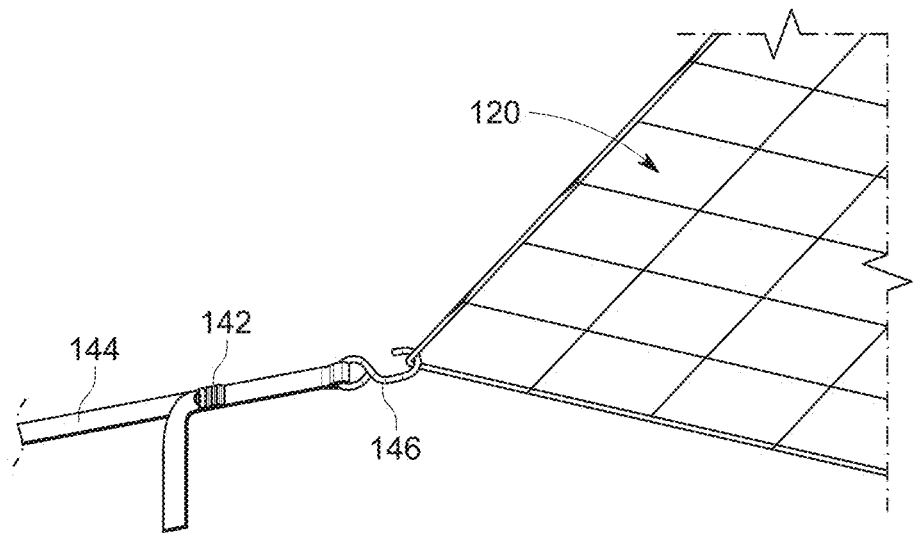
FIG. 5B is an enlarged lower perspective view of an alternate embodiment of dashed area 2 of FIG. 1 of the elevated net system of FIG. 1 in accordance with the present disclosure.
Figure 5C:
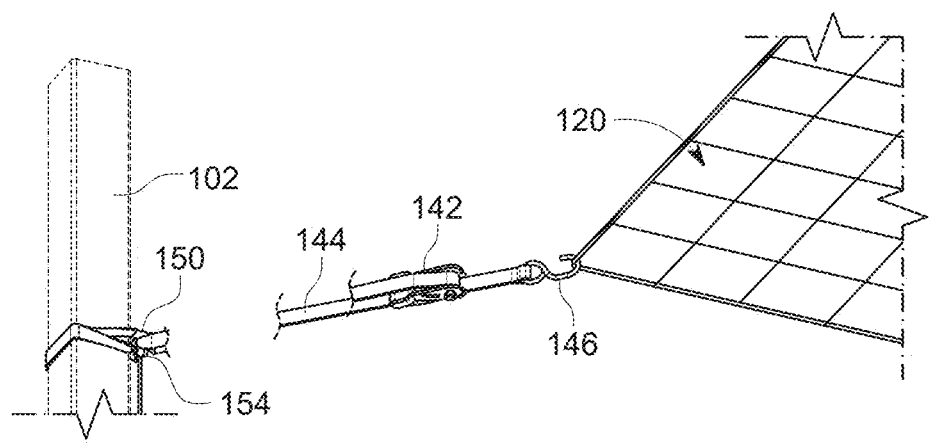
FIG. 5C is an enlarged lower perspective view of an alternate embodiment of dashed area 2 of FIG. 1 of the elevated net system of FIG. 1 in accordance with the present disclosure.

The elevated net system 100 may further include a plurality of corner attachment tethers 140. Each of the plurality of corner attachment tethers 140 may be configured to be coupled between the perimeter support 130 at one of the plurality of corners 124 of the net 120 and one of the plurality of support posts 102. Each of the plurality of corner attachment tethers 140 may include an adjustable buckle 142, a corner strap 144 received by the adjustable buckle 142, and one of a hook 146 or a turnbuckle 148 coupled to the adjustable buckle 142. For example, the corner strap 144 may extend from the adjustable buckle 142 in an opposite direction from that of the one of the hook 146 of the turnbuckle 148. As illustrated in FIGS. 1-3 and 6, the adjustable buckle 142 may be a cam buckle or lashing strap. In certain optional embodiments, as illustrated in FIG. 5A, the adjustable buckle 142 may be a rope cam lock. In other optional embodiments, as illustrated in FIG. 5B, the adjustable buckle 142 may be a standard strap adjuster. In further embodiments, as illustrated in FIG. 5C, the adjustable buckle 142 may be a retractable ratchet.

The corner strap 144 may be a flat strap, rope, or the like made from various materials. The corner strap 144 may include a first corner strap end loop 150 and a second corner strap end loop 152. The corner strap 144 may have a length defined between the first and second corner strap end loops 150, 152 that is about fourteen (14) feet. In some embodiments, the length may be between about twelve (12) feet and about twenty (20) feet. In other embodiments, the length may be further customizable beyond this exemplary range. In certain optional embodiments, the second corner strap end loop 152 may be larger than the first corner strap end loop 150. In other optional embodiments, the second corner strap end loop 152 may be about twice as large as the first corner strap end loop 150. For example, the second corner strap end loop 152 may have a diameter about twice as large as a diameter of the first corner strap end loop 150. Further for example, the first corner strap end loop 150 may have a diameter of three (3) inches and the second corner strap end loop 152 may have a diameter of six (6) inches. In other optional embodiments, the diameters of the first and second corner strap end loops 150, 152 may be different.

Figure 2:
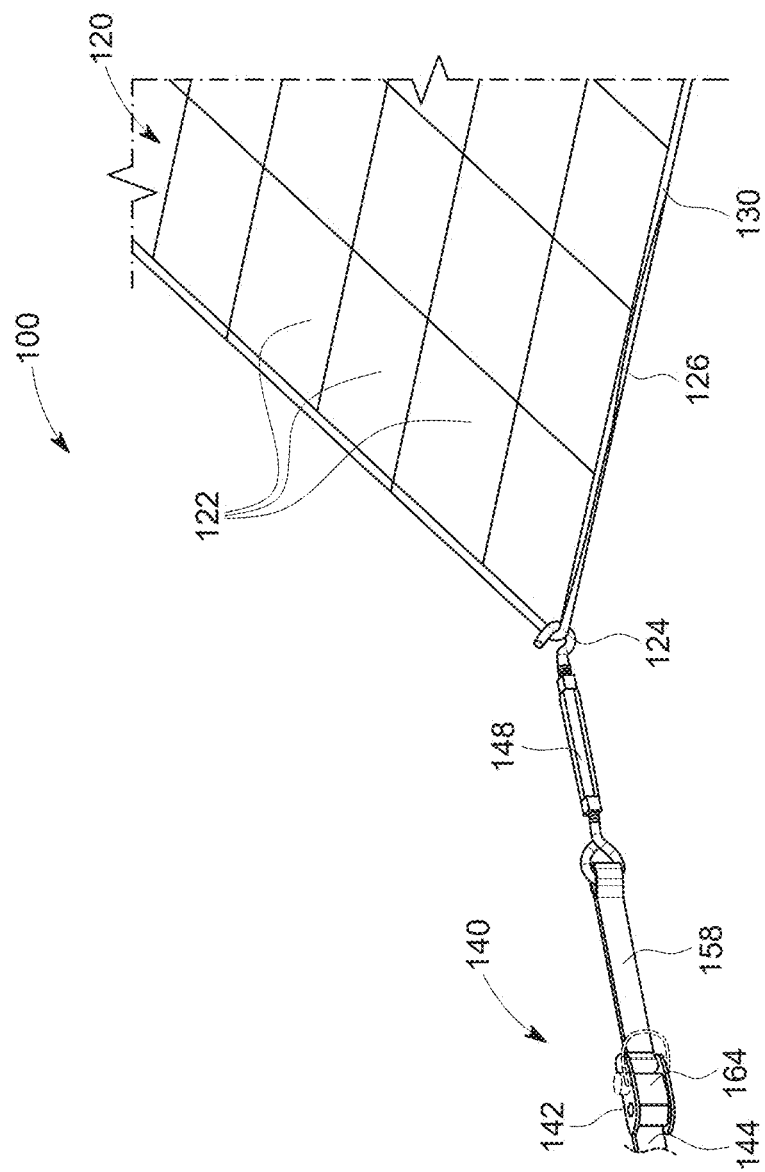
FIG. 2 is an enlarged perspective view of dashed area 2 of FIG. 1 of the elevated net system of FIG. 1 in accordance with the present disclosure.
Figure 2:
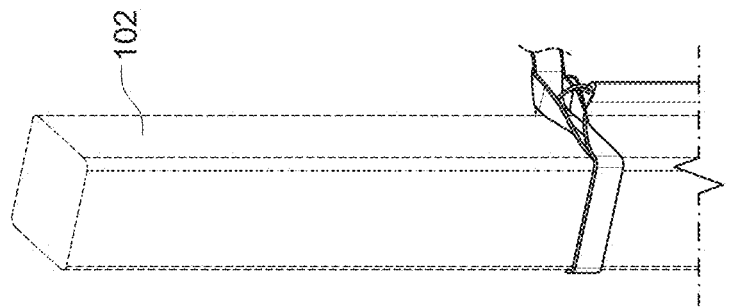
Figure 3:
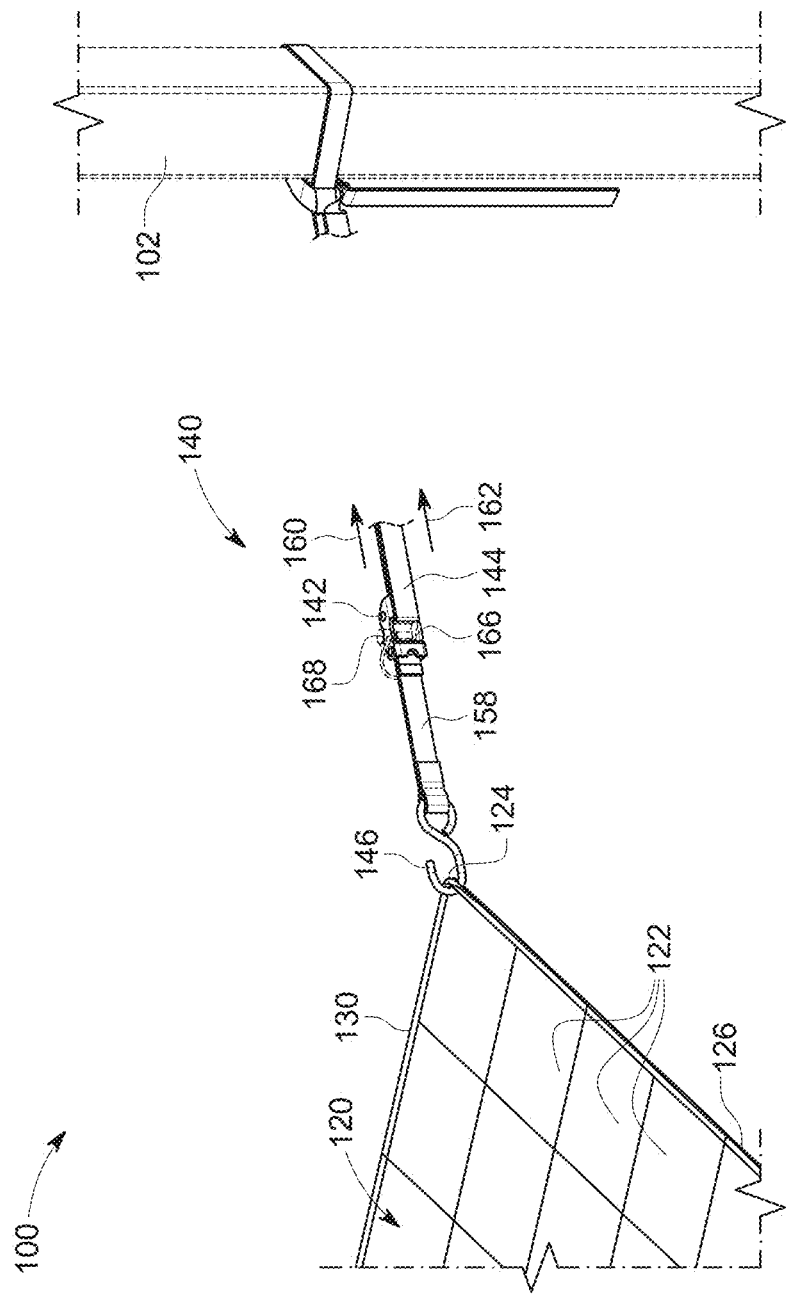
FIG. 3 is an enlarged perspective view of dashed area 3 of FIG. 1 of the elevated net system of FIG. 1 in accordance with the present disclosure.
Figure 4:
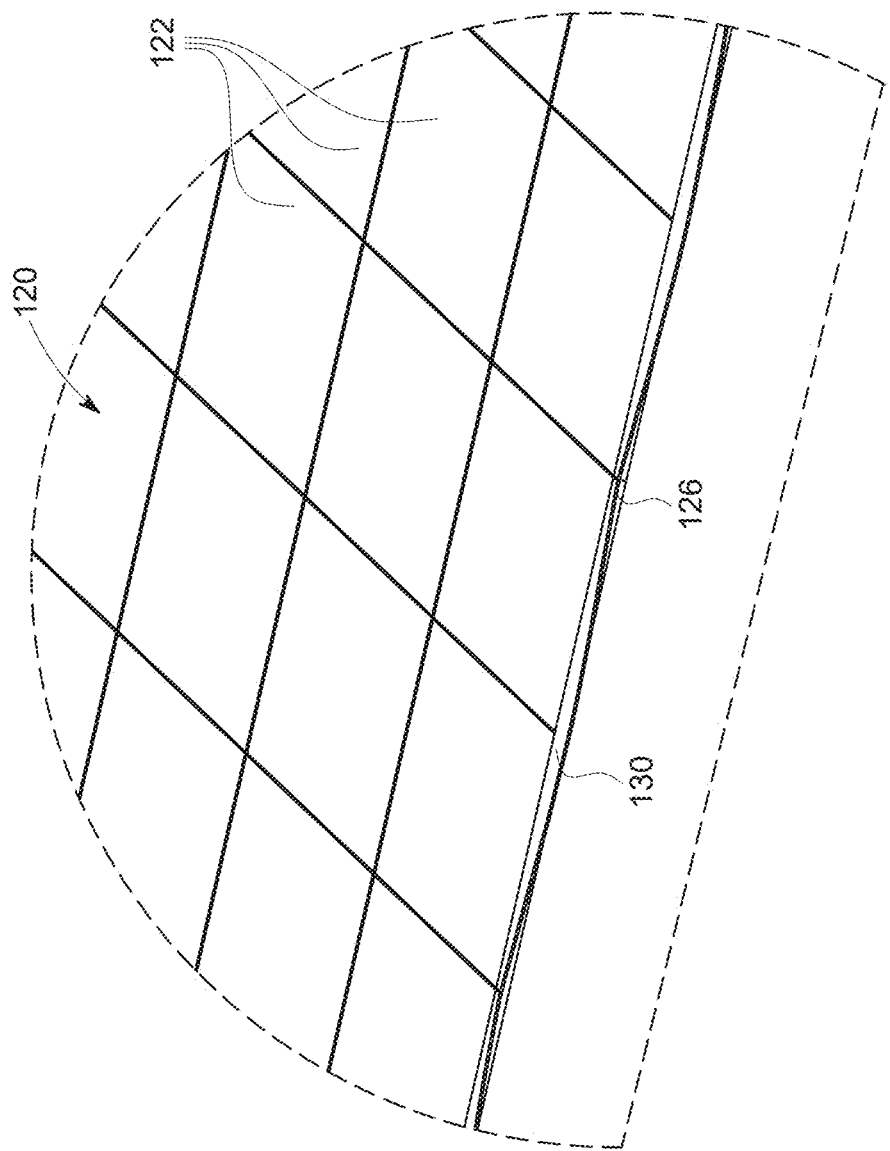
FIG. 4 an enlarged perspective view of dashed area 4 of FIG. 1 of the elevated net system of FIG. 1 in accordance with the present disclosure.
Figure 6:
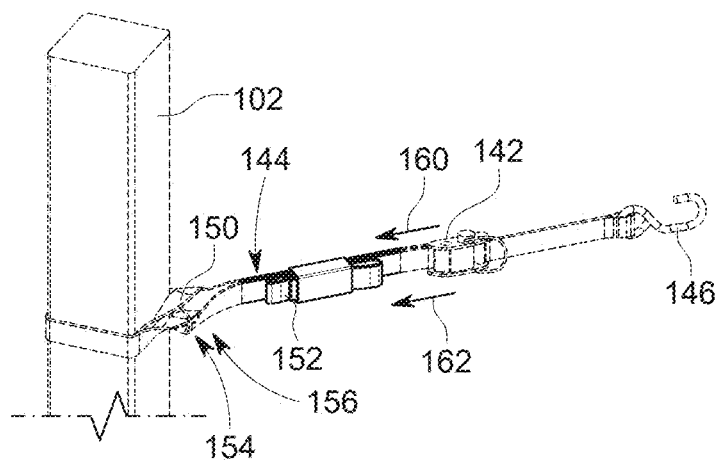
FIG. 6 is an enlarged perspective view of a corner attachment tether of FIG. 2 with excess portions of the strap in a stored configuration in accordance with the present disclosure.

As illustrated in FIGS. 2, 3, and 6, the first corner strap end loop 150 may be configured to be wrapped around one of the plurality of support posts 102 by passing the second corner strap end loop 152 through the first corner strap end loop 150. The first corner strap end loop 150 may include a pair of rings 154 positioned thereon. The pair of rings 154 may also be referred to herein as two rings 154 and may be made of various materials, such as, for example, metal or the like. A tension on the corner strap 144 may be increased by grabbing the second corner strap end loop 152 and pulling the corner strap 144 through the adjustable buckle 142. Depending upon an installation location, the second corner strap end loop 152 may be passed through the paid of rings 154 prior to pulling or tightening. This may advantageously optimally align the portion of the corner strap 144 leading to the second corner strap end loop 152 with the adjustable buckle 142. Once properly tightened, as illustrated in FIGS. 2, 3, and 6, the second corner strap end loop 152 may be passed through one ring of the pair of rings 154 to define a locked configuration 156. The locked configuration 156 of the corner strap 144 with the pair of rings 154 may be an additional locking measure beyond positional locking provided by the adjustable buckle 142 to further prevent accidental release of tension on the elevated net system 100 and/or prevent any tampering with the elevated net system 100.

As illustrated in FIGS. 2-3, the hook 146 or the turnbuckle 148 may be coupled to the adjustable buckle 142 using a coupling strap 158. The coupling strap 158 may be about three (3) inches long. In other embodiments, the length of the coupling strap 158 may be greater than or less than three (3) inches. In certain optional embodiments, as illustrated in FIG. 5A, the hook 146 or the turnbuckle 148 (not illustrated) may be directly coupled to the adjustable buckle 142. In other optional embodiments (not illustrated), the hook 146 or the turnbuckle 148 may be integrally formed with the adjustable buckle 142. In certain optional embodiments, as illustrated, only one of the plurality of corner attachment tethers 140 may include the turnbuckle 148. In other optional embodiments (not illustrated), more than one of the plurality of corner attachment tethers 140 may include the turnbuckle 148.

The corner strap 144 may be slidably received by the adjustable buckle 142 in a first corner strap direction 160 defined from the adjustable buckle 142 towards the second corner strap end loop 152. The corner strap 144 may be frictionally engaged by the adjustable buckle 142 in a second corner strap direction 162 defined from the adjustable buckle 142 towards the first corner strap end loop 150. The adjustable buckle 142 may include a release lever 164 configured to allow the adjustable buckle 142 to move along the corner strap 144 in the second corner strap direction 162. As illustrated in FIG. 3, the adjustable buckle 142 may include locking holes 166 configured to receive a locking pin 168. The locking pin 168 when received by the locking holes 166 may be configured to interfere with the release lever 164 thus preventing engagement of the release lever 164 and movement of the corner strap 144 in the second corner strap direction 162.

Figure 7:
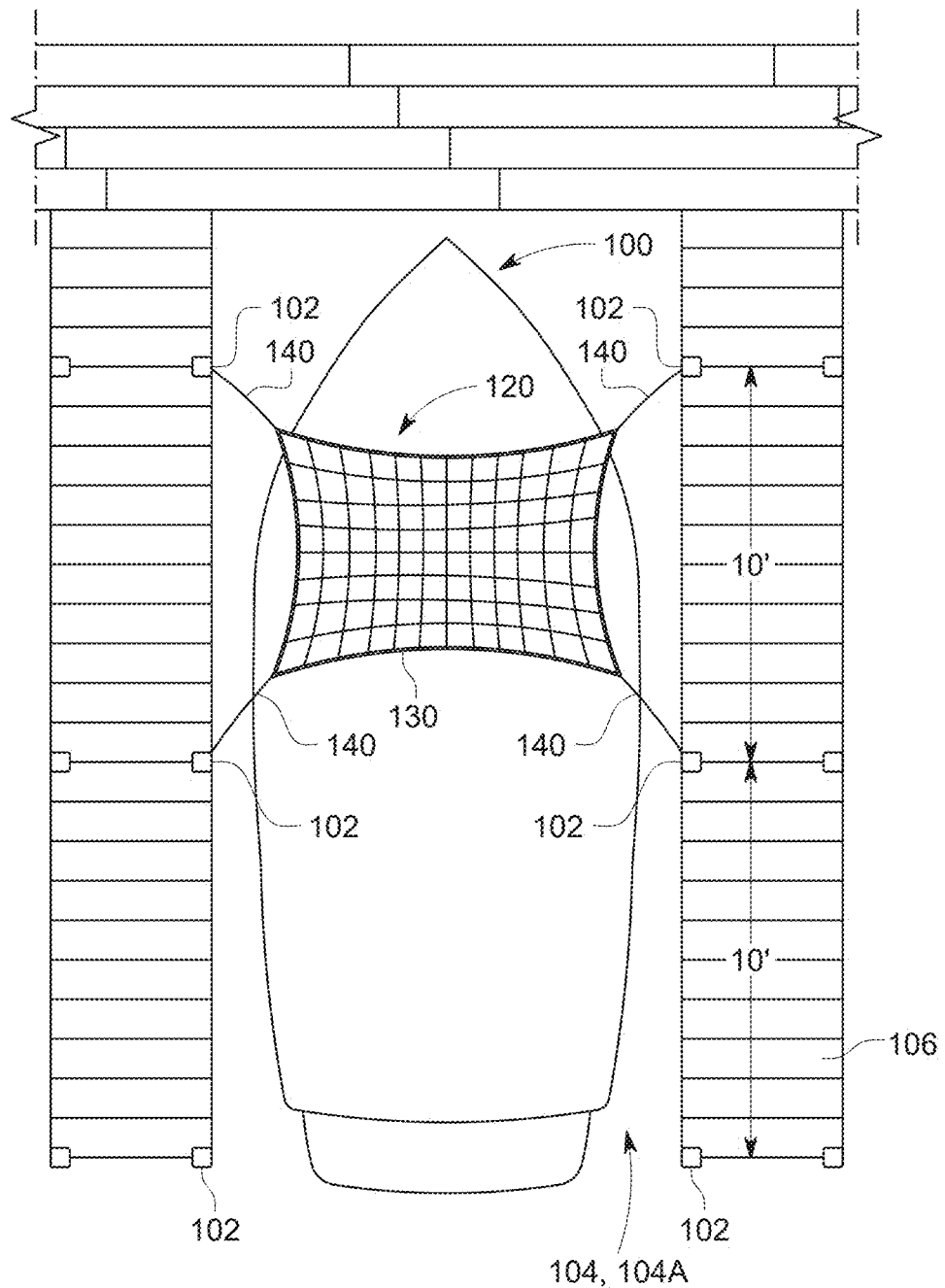
FIG. 7 is a top plan view of the elevated net system of FIG. 1 installed in a single boat slip in accordance with the present disclosure.
Figure 8:
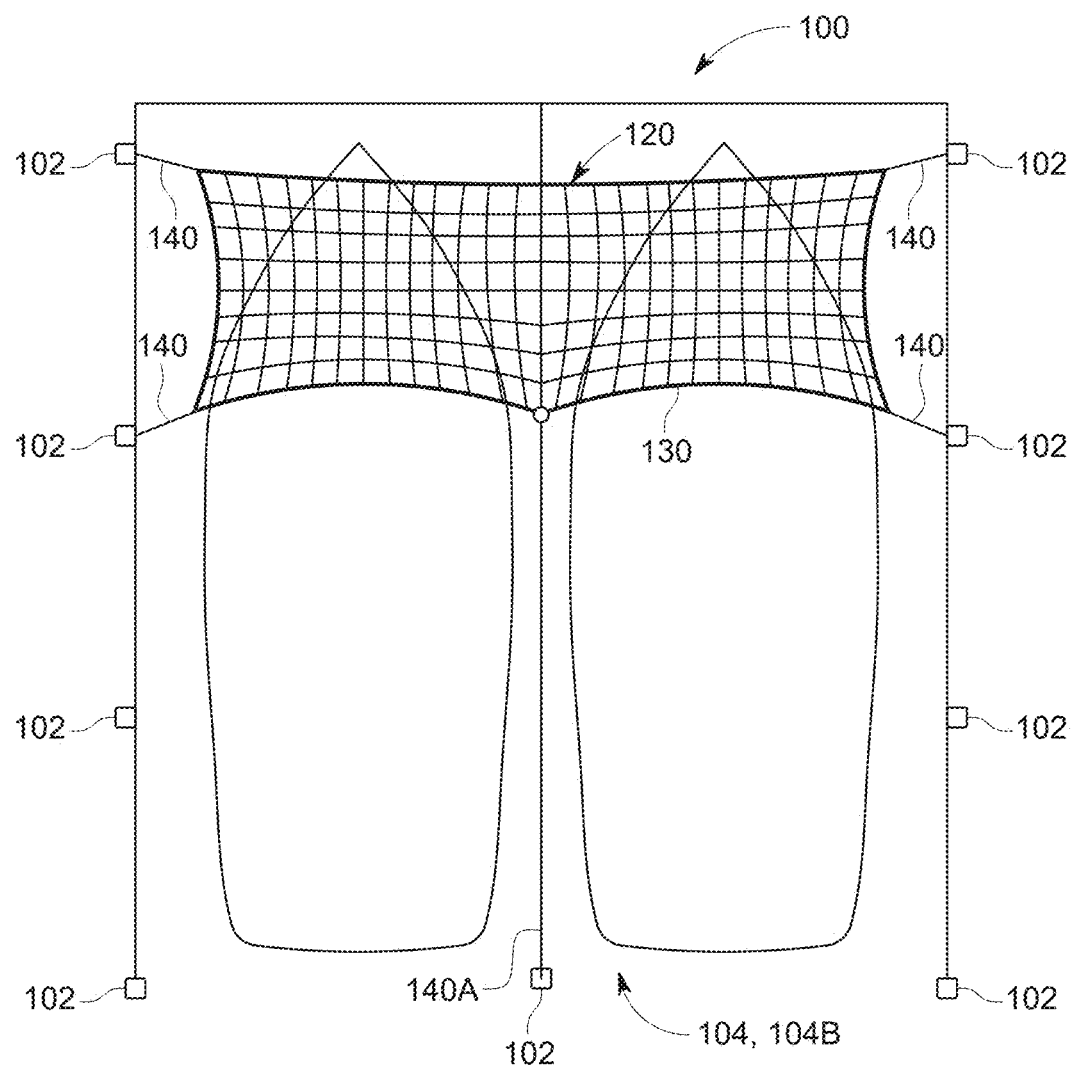
FIG. 8 is a top plan view of an embodiment of the elevated net system installed in a double boat slip in accordance with the present disclosure.
Figure 9:
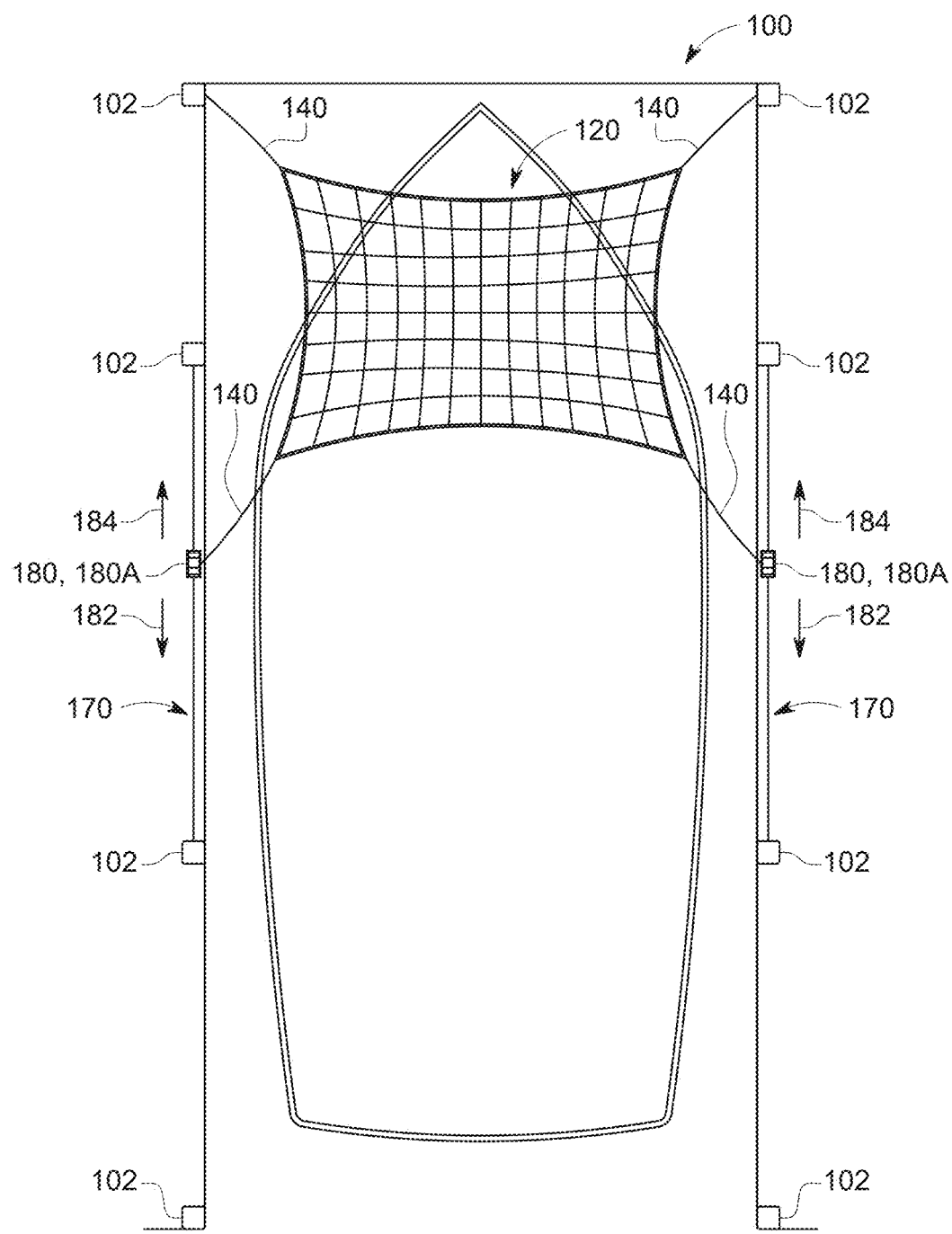
FIG. 9 is a top plan view of the elevated net system including an embodiment of two bridging strap assemblies installed in a single boat slip in accordance with the present disclosure.
Figure 13:
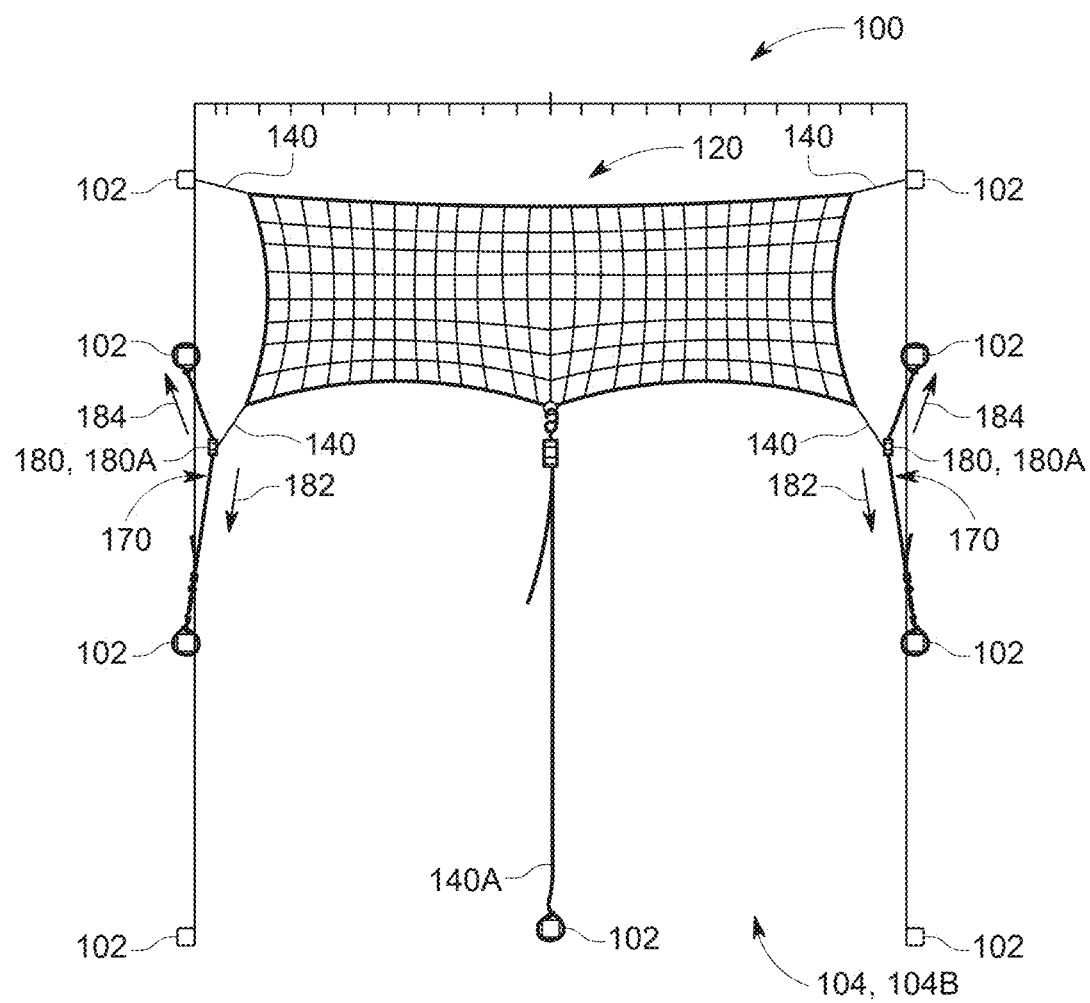
FIG. 13 is a top plan view of the elevated net system including the two bridging strap assemblies of FIG. 9 installed in a double boat slip in accordance with the present disclosure.

As illustrated in FIG. 7, the net 120 may be sized for a single boat slip 104A. As illustrated in FIGS. 8 and 13, the net may be sized for a double boat slip 104B. In the case of a double boat slip 104B, the elevated net system 100 may implement an additional attachment tether 140A, which is substantially similar to the plurality of corner attachment tethers, but is configured to engage the perimeter support 130 along the perimeter 126 of the net 120 between the plurality of corners 124.

Referring to FIGS. 9-16, the elevated net system 100 may further include at least one bridging strap assembly 170 configured to be coupled between two of the plurality of support posts 102. The at least one bridging strap assembly 170 may include at least one anchor point 180 coupled to a bridging strap 172 of the at least one bridging strap assembly 170. The at least on anchor point 180 may be configured to receive one of the plurality of corner attachment tethers 140. The at least one bridging strap assembly 170 may be extremely helpful in cases where the plurality of support posts 102 have odd spacing or are not positioned to enable the net 120 to be installed in a preferred location.

Figure 10A:
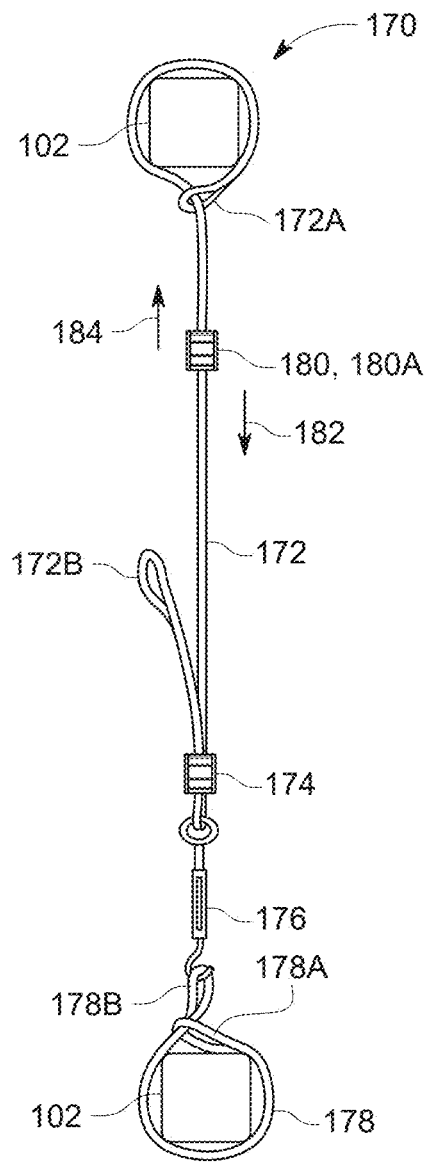
FIG. 10A is a top plan view of one of the bridging strap assemblies of FIG. 9 in accordance with the present disclosure.
Figure 10B:
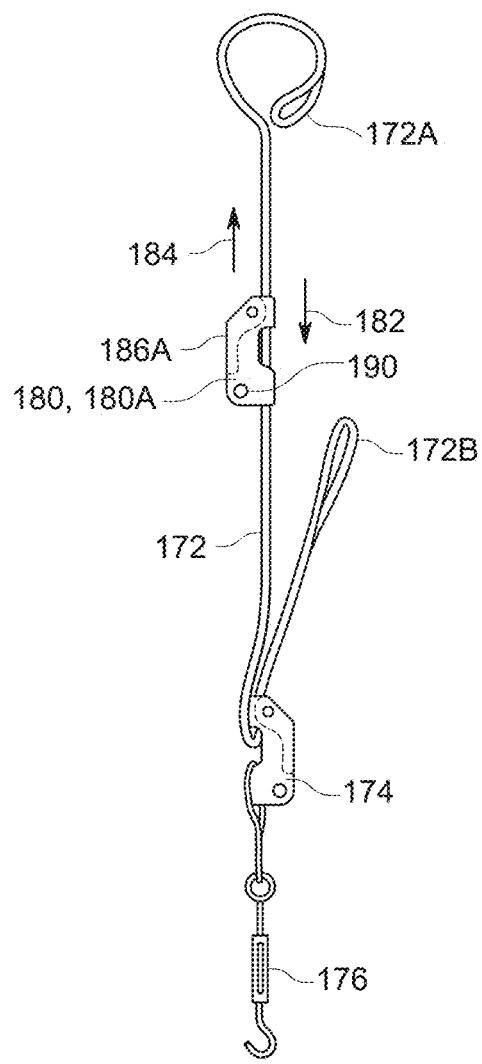
FIG. 10B is a top plan view of a portion of the bridging strap assembly of FIG. 10A in accordance with the present disclosure.
Figure 11A:
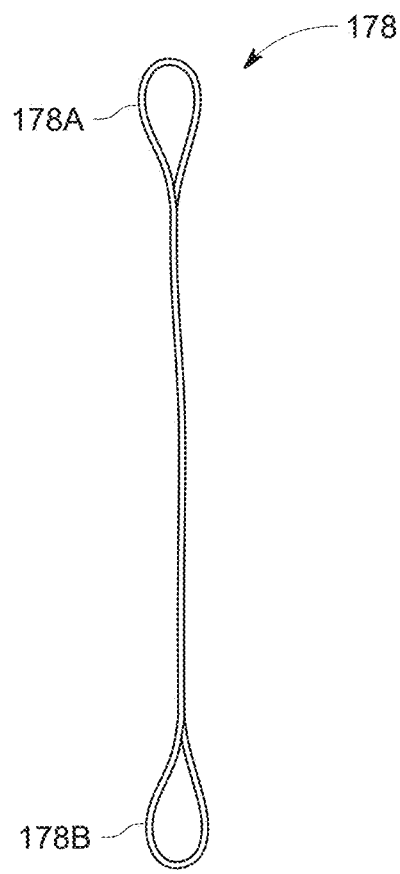
FIG. 11A is a top plan view of an embodiment of a pole strap of the bridging strap assembly of FIG. 10A in accordance with the present disclosure.
Figure 11B:
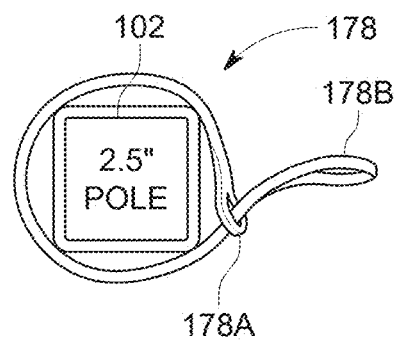
FIG. 11B is a top plan view of the pole strap of FIG. 11A in conjunction with a support post in accordance with the present disclosure.

As illustrated in FIG. 10A, each of the at least one bridging strap assembly 170 may include an adjustable buckle 174, the bridging strap 172 received by the adjustable buckle 174, the at least one anchor point 180 coupled to the bridging strap 172, one of a hook (not illustrated) or a turnbuckle 176 coupled to the adjustable buckle 174, and a pole strap 178. Similar to the above description, the hook or turnbuckle 176 may be coupled to the adjustable buckle 174 directly, integrally formed therewith, or coupled thereto using a coupling strap. The at least one bridging strap assembly 170 is shown in additional detail in FIG. 10B. The bridging strap 172 may include a first bridging strap end loop 172A and a second bridging strap end loop 172B. The bridging strap 172 may have a length defined between the first and second bridging strap end loops 172A, 172B that is about fourteen (14) feet. In some embodiments, the length may be between about twelve (12) feet and about twenty (20) feet. In other embodiments, the length may be between about ten (10) feet and about thirty (30) feet. In further embodiments, the length may be further customizable beyond this exemplary range. The first bridging strap end loop 172A may be configured to be wrapped around one of the plurality of support posts 102 by passing the second bridging strap end loop 172B through the first bridging strap end loop 172A. In certain optional embodiments, the bridging strap end loop 172A may have a diameter of three (3) inches and the second bridging strap end loop 172B may have a diameter of six (6) inches. In other optional embodiments, the diameters of the first and second bridging strap end loops 172A, 172B may be different.

Figure 12A:
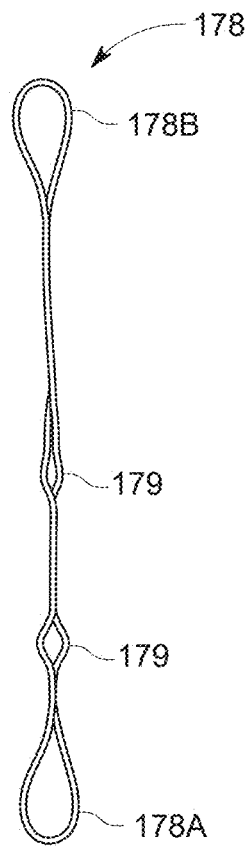
FIG. 12A is a top plan view of another embodiment of a pole strap of an embodiment of the bridging strap assembly in accordance with the present disclosure.
Figure 12B:
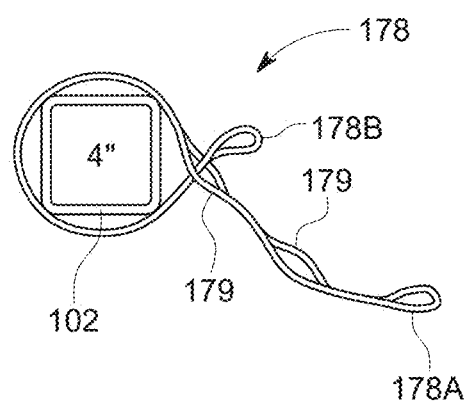
FIG. 12B is a top plan view of the pole strap of FIG. 12A in conjunction with a larger support post in accordance with the present disclosure.

As illustrated in FIGS. 10A and 11A-12B, the pole strap 178 may include a first pole strap end loop 178A and a second pole strap end loop 178B. The pole strap 178 may have a length defined between the first and second pole strap end loops 178A, 178B that is about fourteen (14) inches. In other embodiments, the length may be about thirty-four (34) inches. In further embodiments, the length may be further customizable beyond this exemplary range. Each of the first and second pole strap end loops 178A, 178B may have a diameter of about two (2) inches. In other embodiments, the diameters may be different. The first pole strap end loop 178A may be configured to be wrapped around a different one of the plurality of support posts 102 by passing the second pole strap end loop 178B through the first pole strap end loop 178A. As illustrated in FIGS. 12A-12B, the pole strap 178 may include additional loops 179 positioned between the first pole strap end loop 178A and the second pole strap end loop 178B to enable the pole strap 178 to be wrapped around larger or smaller support posts. For example, the first pole strap end loop 178A may be configured to be wrapped around one of the plurality of support posts 102 by passing the second pole strap end loop 178B through one of the first pole strap end loop 178A or one of the additional loops 179.

As illustrated in FIGS. 9-10B and 13-14, the at least one anchor point 180 may comprise a first adjustable anchor buckle 180A. The first adjustable anchor buckle 180A may be installed on an opposite side of the bridging strap 172 than the adjustable buckle 174. The first adjustable anchor buckle 180A may be configured to freely move along the bridging strap 172 in a first bridging strap direction 182 and frictionally engage the bridging strap 172 in a second bridging strap direction 184. The hook or the turnbuckle 176 may be configured to be hooked onto the second pole strap end loop 178B. A tension on the at least one bridging strap assembly 170 may be increased or adjusted by pulling the second bridging strap end loop 172B or adjusting the turnbuckle 176. The turnbuckle 176 may enable the bridging strap 172 to have the proper tension for supporting the net 120 via the at least one anchor point 180.

Figure 15:
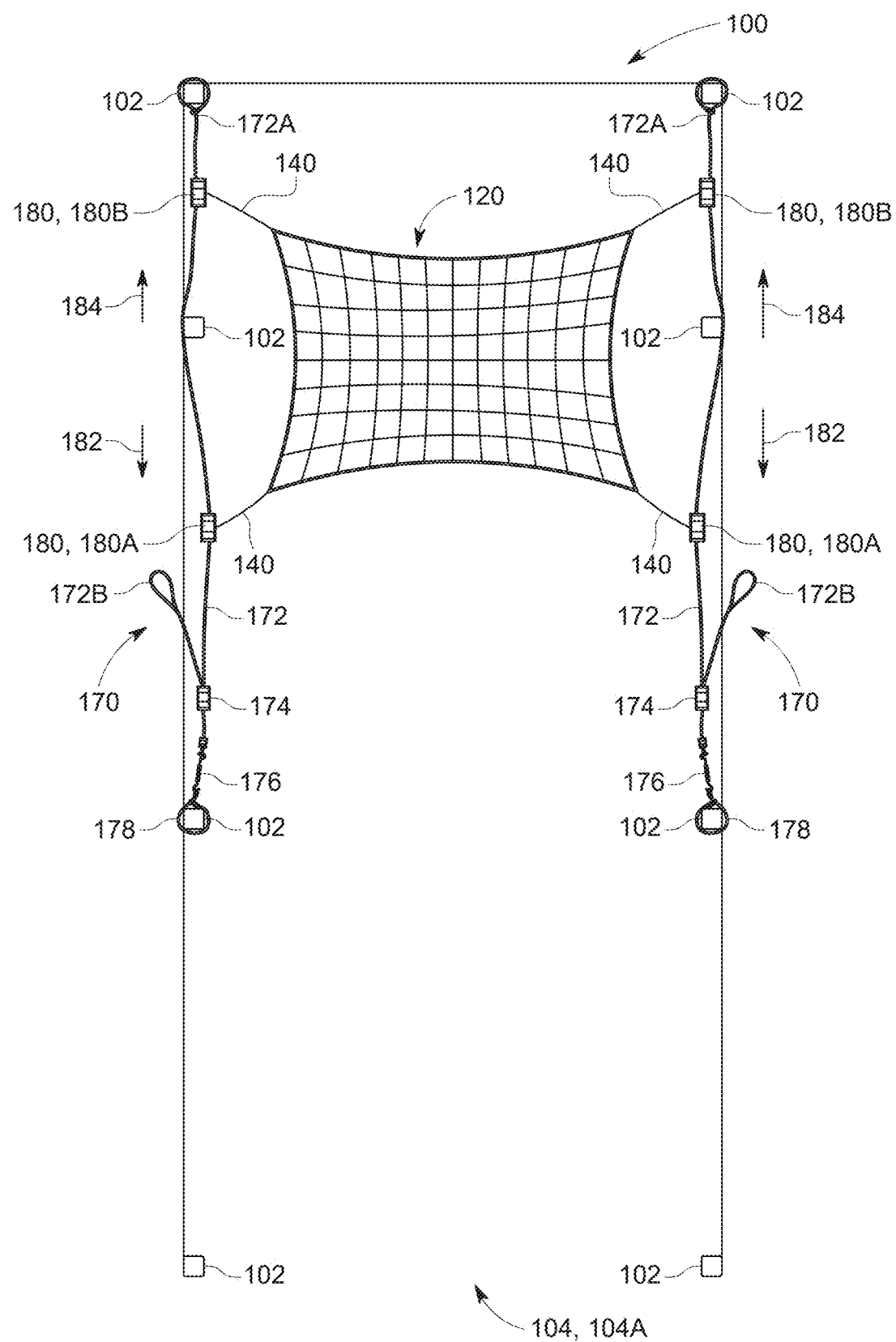
FIG. 15 is a top plan view of the elevated net system including another embodiment of two bridging strap assemblies installed in a single boat slip in accordance with the present disclosure.
Figure 16:
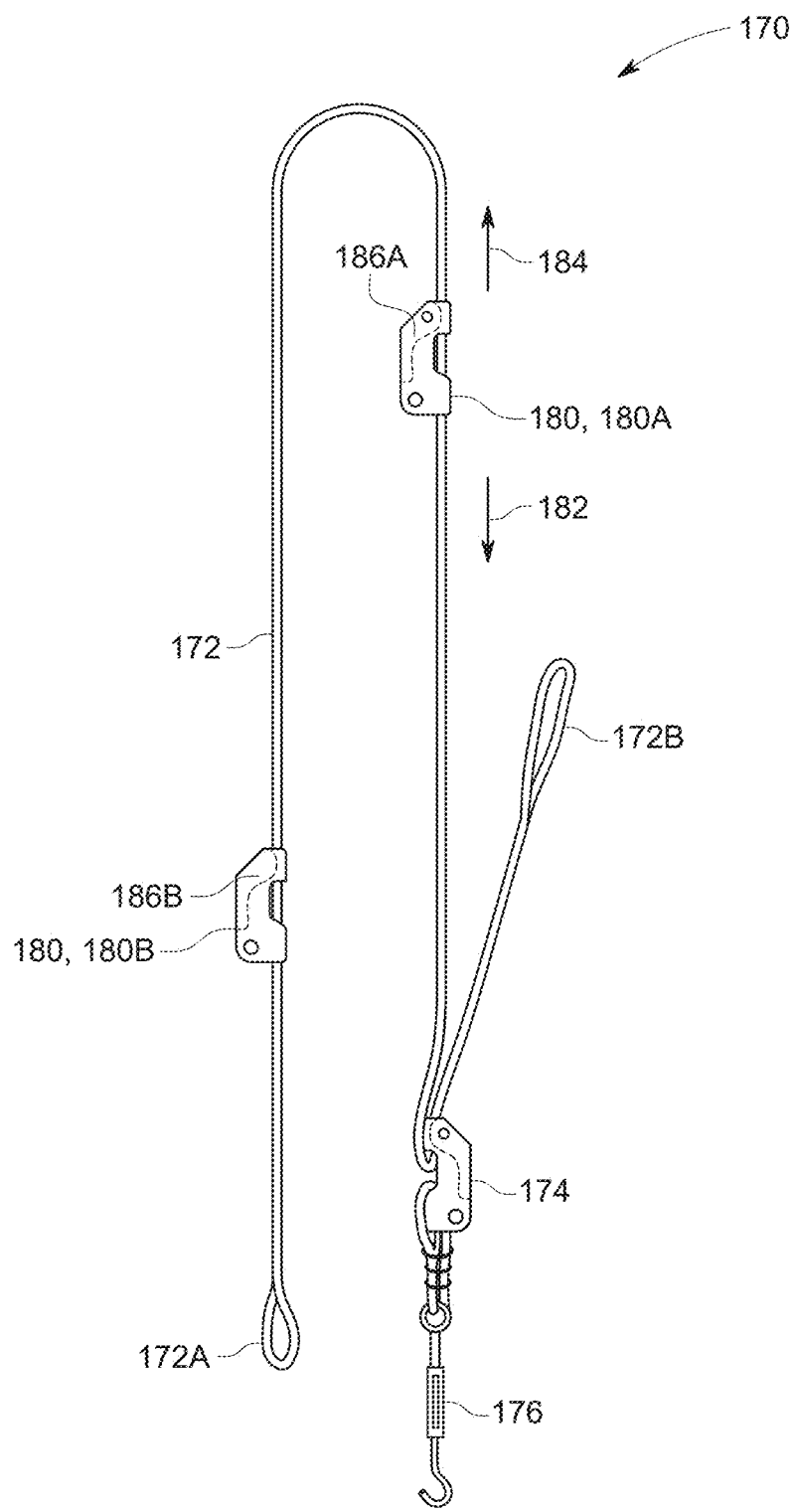
FIG. 16 is a top plan view of one of the bridging strap assemblies of FIG. 15 in accordance with the present disclosure.

As illustrated in FIGS. 15-16, the at least one anchor point 180 may comprise the first adjustable anchor buckle 180A and a second adjustable anchor buckle 180B. The second adjustable anchor buckle 180B may be positioned on a same side of the bridging strap 172 as the first adjustable anchor buckle 180A. The second adjustable anchor buckle 180B may be substantially similar to the first adjustable anchor buckle 180A, except oriented on the bridging strap 172 to freely move opposite the first adjustable anchor buckle 180A. As such, the second adjustable anchor buckle 180B may be configured to freely move along the bridging strap 172 in the second bridging strap direction 184 and frictionally engage the bridging strap 172 in the first bridging strap direction 182. By including first and second adjustable anchor buckles 180A, 180B, the at least one bridging strap assembly 170 enables the net 120 to be laterally adjusted along the bridging strap 172 for more precise placement of the net 120 since the at least one anchor point 180 may be adjusted along the bridging strap 172.

Figure 14:
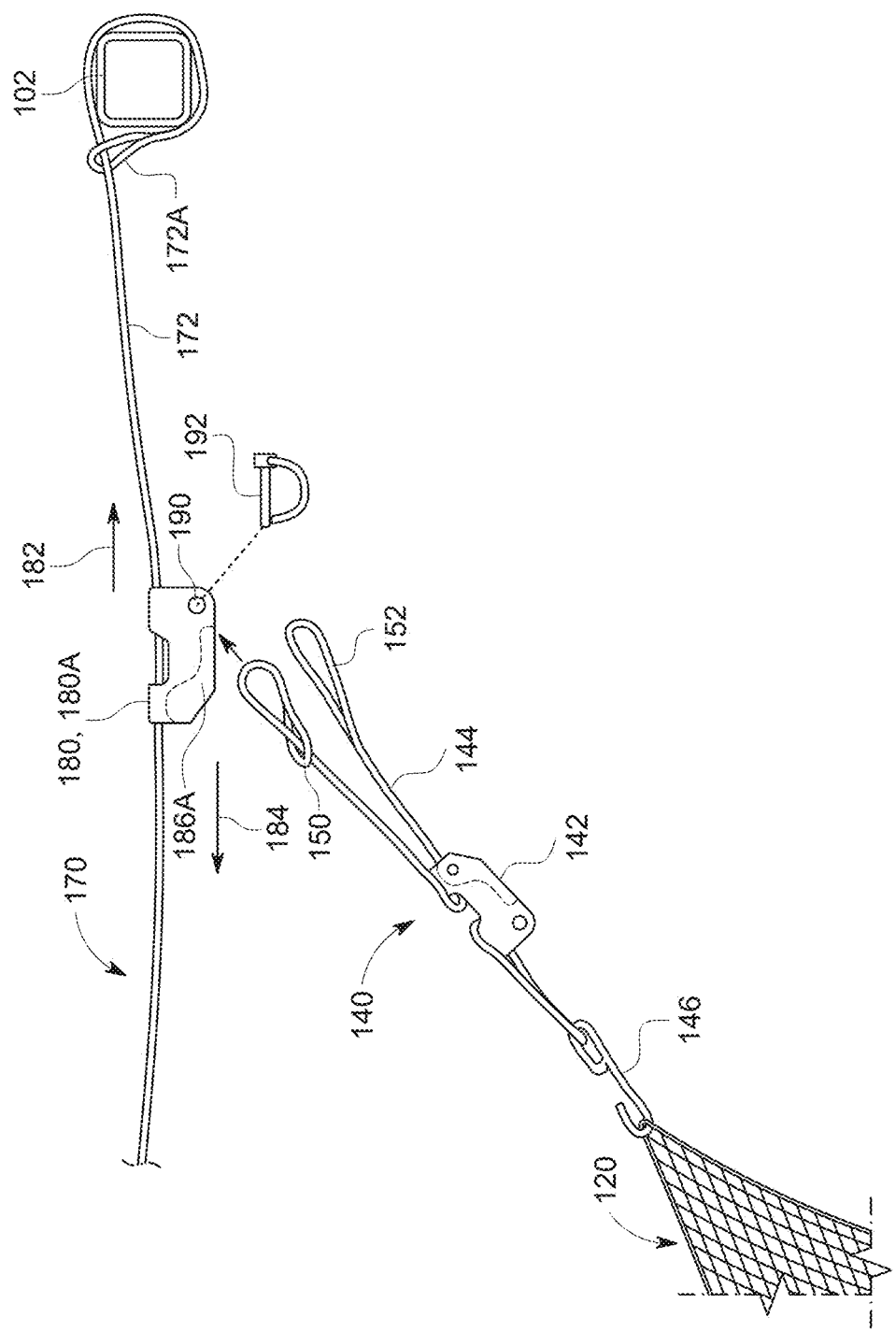
FIG. 14 is an enlarged top plan view of a portion of the bridging strap assembly of FIG. 10A in conjunction with one of the corner attachment tethers of the elevated net system in accordance with the present disclosure.

As illustrated in FIGS. 14 and 16, the first adjustable anchor buckle 180A may include a release lever 186A configured to allow the first adjustable anchor buckle 180A to move along the bridging strap 172 in the second bridging strap direction 184 when engaged. As illustrated in FIG. 16, the second adjustable anchor buckle 180B may include a release lever 186B configured to allow the second adjustable anchor buckle 180B to move along the bridging strap 172 in the first bridging strap direction 182 when engaged. In certain optional embodiments (not illustrated), each of the adjustable buckle 174 and first and second adjustable anchor buckles 180A, 180B may include locking holes and a locking pin to prevent engagement of the respective release lever.

As illustrated in FIG. 14, the at least one anchor point 180 may include fastening holes 190 configured to receive a fastening pin 192. The fastening pin 192 may be configured to receive one of the plurality of corner attachment tethers 140, or more specifically, a first corner strap end loop 150 thereof. The fastening pin 192 may also be referred to herein as a hitch pin 192.

In certain optional embodiments (not illustrated), the first bridging strap end loop 172A of the bridging strap 172 may include a pair of rings which are substantially similar to and function similar to the pair of rings 154 of the plurality of corner attachment tethers 140.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An elevated net system configured to be coupled between a plurality of support posts, the elevated net system comprising:
   a net having a plurality of openings and a plurality of corners defined along a perimeter of the net;
   a closed-loop perimeter support freely moveable within the openings of the net along the perimeter of the net; and
   a plurality of corner attachment tethers, each of the plurality of corner attachment tethers configured to be coupled between the perimeter support at one of the plurality of corners of the net and one of the plurality of support posts, each of the plurality of corner attachment tethers including an adjustable buckle, a corner strap received by the adjustable buckle, and one of a hook or a turnbuckle coupled to the adjustable buckle, the corner strap including a first corner strap end loop and a second corner strap end loop, the corner strap slidably received by the adjustable buckle in a first corner strap direction and is frictionally engaged by the adjustable buckle in a second corner strap direction, the adjustable buckle including a corner strap release lever configured to allow the adjustable buckle to move along the corner strap in the second corner strap direction when engaged, the adjustable buckle further including locking holes and a locking pin configured to be received by the locking holes, the locking pin configured to prevent engagement of the corner strap release lever.

2. The elevated net system of claim 1, wherein:
   the second corner strap end loop is larger than the first corner strap end loop.

3. The elevated net system of claim 1, wherein:
   the second corner strap end loop is twice as large as the first corner strap end loop.

4. The elevated net system of claim 1, wherein:
   the first corner strap end loop is configured to be wrapped around one of the plurality of support posts by passing the second corner strap end loop through the first corner strap end loop.

5. The elevated net system of claim 1, wherein:
   the one of the hook or the turnbuckle is coupled to the adjustable buckle using a coupling strap.

6. The elevated net system of claim 1, wherein:
   the first corner strap end loop includes two rings positioned thereon, the two rings configured to receive the second corner strap end loop in a locked configuration.

7. The elevated net system of claim 1, wherein:
   the net includes four corners.

8. The elevated net system of claim 1, wherein:
   only one of the plurality of corner attachment tethers includes a turnbuckle for adjusting a tension on the closed-loop perimeter support when the elevated net system is installed.

9. An elevated net system configured to be coupled between a plurality of support posts, the elevated net system comprising:
   a net having a plurality of openings and a plurality of corners defined along a perimeter of the net;
   a closed-loop perimeter support freely moveable within the openings of the net along the perimeter of the net;
   a plurality of corner attachment tethers, each of the plurality of corner attachment tethers configured to be coupled between the perimeter support at one of the plurality of corners of the net and one of the plurality of support posts; and
   at least one bridging strap assembly configured to be coupled between two of the plurality of support posts, the at least one bridging strap assembly including at least one anchor point coupled to a bridging strap of the at least one bridging strap assembly, the at least on anchor point configured to receive one of the plurality of corner attachment tethers.

10. The elevated net system of claim 9, wherein:
    the at least one anchor point comprises a first adjustable anchor buckle configured to be freely movable along the bridging strap in a first bridging strap direction and frictionally engage the bridging strap in a second bridging strap direction.

11. The elevated net system of claim 10, wherein:
the first adjustable anchor buckle includes a bridging strap release lever configured to allow the first adjustable anchor buckle to move along the bridging strap in the second bridging strap direction when engaged.

12. The elevated net system of claim 10, wherein:
the at least one anchor point further comprises a second adjustable anchor buckle, the second adjustable anchor buckle configured to freely move along the bridging strap in the second bridging strap direction and frictionally engage the bridging strap in the first bridging strap direction.

13. The elevated net system of claim 10, wherein:
each of the at least one bridging strap assembly includes an adjustable buckle, the bridging strap received by the adjustable buckle, the at least one anchor point coupled to the bridging strap, one of a hook or a turnbuckle coupled to the adjustable buckle, and a pole strap.

14. The elevated net system of claim 13, wherein:
the bridging strap includes a first bridging strap end loop and a second bridging strap end loop, the first bridging strap end loop configured to be wrapped around one of the plurality of support posts by passing the second bridging strap end loop through the first bridging strap end loop; and
the pole strap includes a first pole strap end loop and a second pole strap end loop, the first pole strap end loop configured to be wrapped around a different one of the plurality to support posts by passing the second pole strap end loop through the first pole strap end loop.

15. The elevated net system of claim 14, wherein:
the one of the hook or the turnbuckle is configured to be hooked onto the second pole strap end loop of the pole strap; and
a tension on the at least one bridging strap assembly between the one and the different one of the plurality of support posts is increased at least in part by pulling the second bridging strap end loop of the bridging strap.

16. The elevated net system of claim 9, wherein:
the at least one anchor point includes fastening holes and a fastening pin configured to be received by the fastening holes, the fastening pin configured to receive one of the plurality of corner attachment tethers.

17. The elevated net system of claim 9, wherein:
each of the plurality of corner attachment tethers includes an adjustable buckle, a corner strap received by the adjustable buckle, and one of a hook or a turnbuckle coupled to the adjustable buckle.

18. The elevated net system of claim 17, wherein:
the corner strap includes a first corner strap end loop and a second corner strap end loop.

19. The elevated net system of claim 9, wherein:
the net includes four corners.

20. The elevated net system of claim 9, wherein:
only one of the plurality of corner attachment tethers includes a turnbuckle for adjusting a tension on the closed-loop perimeter support when the elevated net system is installed.

* * * * *